United States Patent [19]

Lewis et al.

[11] 4,133,095

[45] Jan. 9, 1979

[54] TREATING, INCLUDING INDUCTION HEATING OF WELL PIPE CONNECTIONS

[75] Inventors: George E. Lewis, Arcadia, Calif.; Charles A. Bollfrass, Houston, Tex.

[73] Assignee: Hydril Company, Los Angeles, Calif.

[21] Appl. No.: 839,830

[22] Filed: Oct. 6, 1977

[51] Int. Cl.² ............................................. F16L 53/00
[52] U.S. Cl. ...................................... 29/458; 138/33; 166/77.5; 219/10.57; 219/535; 285/41
[58] Field of Search ................. 29/447, 458, 464, 240, 29/281.5; 166/57, 61, 77.5, 302; 219/10.53, 10.57, 8.5, 385, 535, 9.5; 138/33, 35; 403/28, 273, 288; 285/41, 94, 381

[56] References Cited

U.S. PATENT DOCUMENTS

| | | | |
|---|---|---|---|
| 1,817,808 | 8/1931 | Eaton | 29/447 |
| 2,341,670 | 2/1944 | Stinson | 285/381 |
| 2,535,320 | 12/1950 | Richardson | 29/447 |
| 2,992,017 | 7/1961 | Dritz | 285/41 |
| 3,007,022 | 10/1961 | Jackson et al. | 219/8.5 |
| 3,063,143 | 11/1962 | Bodine | 285/381 |
| 3,560,709 | 2/1971 | Crane | 29/447 |
| 3,822,902 | 7/1974 | Maurer et al. | 285/94 |

Primary Examiner—Michael J. Keenan
Attorney, Agent, or Firm—William W. Haefliger

[57] ABSTRACT

Treatment of a steel well pipe connection involves use of an electrical coil and a cylindrical sleeve carrying the coil, and includes the steps:
  (a) relatively applying the sleeve to a position about the pipe connection so that the coil extends about the connection, and
  (b) passing electrical current through the coil to effect induction heating of the connection to temperatures within a range of between about 75° F and 500° F, and
  (c) relatively removing the sleeve from said position.

16 Claims, 6 Drawing Figures

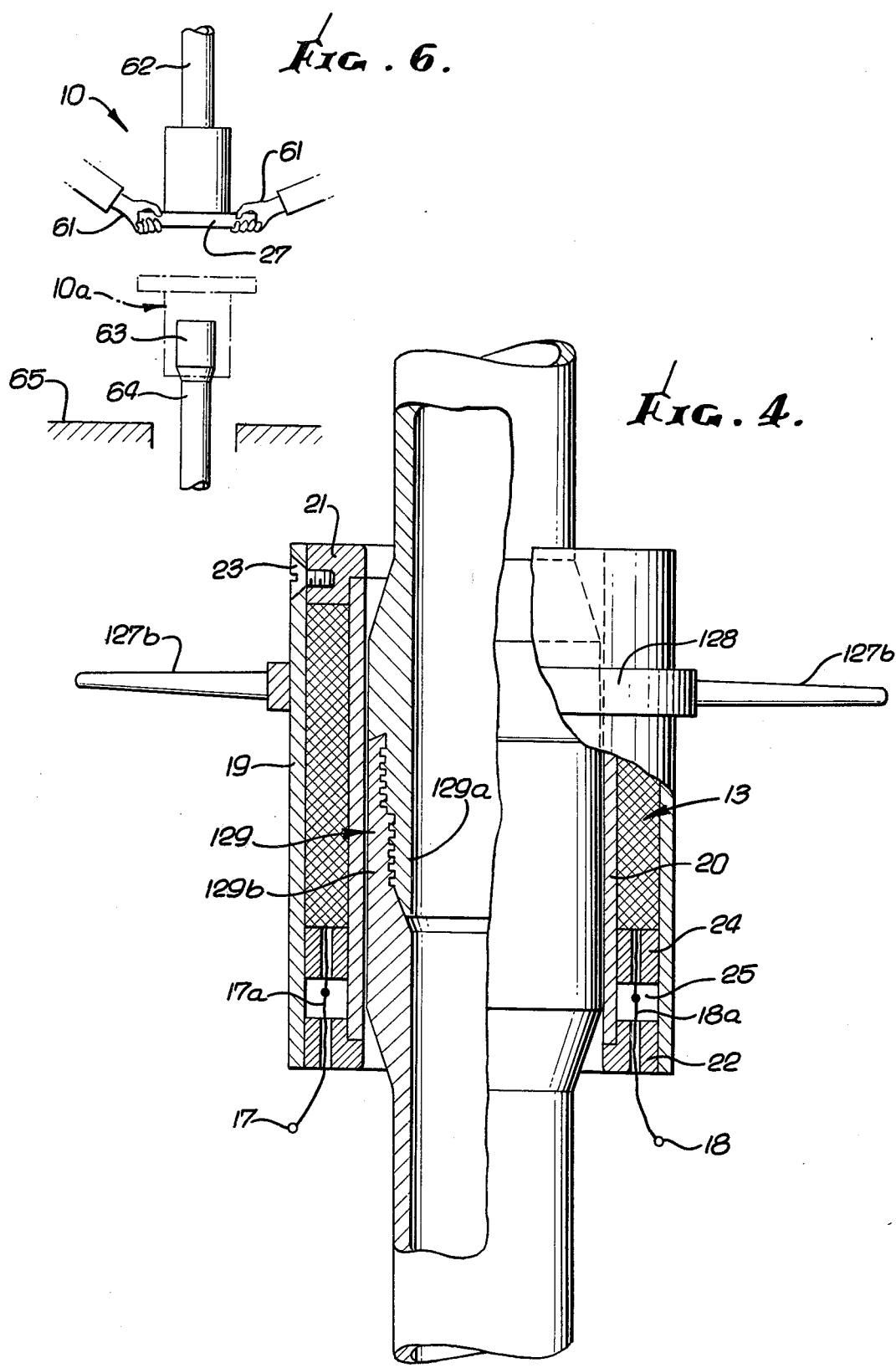

TREATING, INCLUDING INDUCTION HEATING OF WELL PIPE CONNECTIONS

BACKGROUND OF THE INVENTION

This invention relates generally to treating of tubular members, including induction heating of same; more particularly it concerns method and apparatus for induction heating of oil well pipe connections as for example in the field and about oil rigs, to facilitate make-up and disconnection of pipe joints.

When making up oil well tubing and casing it is necessary to remove all foreign materials. After cleaning and inspecting the threads and seals for any transit damage, they are lubricated and screwed together. Under normal ambient temperature conditions these processes are easily performed in the field; however, under arctic winter conditions it has been determined that most solvents will not clean the joints properly, that the lubricant will not spread properly and that threaded joints will not make up fully under usually applied torque ranges and methods. In this regard, the viscosity of the cold, thread lubricant prevents the complete make-up of the threads. After the pipe has been put into the well, the increased temperature will thaw the lubricant and expose loose joints and a possible leaker.

Steam heating has been used to clean the piping but this will cause hard ice to form as the steam condenses. Such ice formation on the threaded joint causes similar problems. Heated buildings have sometimes been provided in which the pipe preparations can be made and, also to provide heated areas for the pipe when running the pipe into the well. However, this method is very costly and not fully satisfactory.

SUMMARY OF THE INVENTION

It is a major object of the invention to provide easily performable method, and readily usable equipment, that will obviate the above problems and will also provide unusual advantages in mode of operation and results, as will appear. In this regard, the invention will be described in terms of treating well pipe, but will be understood as more widely applicable.

Basically, the treating method, including induction heating of steel well pipe connections, involves employment of an electrical coil having generally cylindrical configuration together with a cylindrical sleeve or support for the coil, and includes the steps:

(a) relatively applying the sleeve to a position about the pipe connection so that the coil extends about the connection, and (b) passing electrical current through the coil to effect induction heating of the connection to temperatures within a range of between about 75° F. and 500° F., and (c) relatively removing the sleeve from said position.

The pipe connection typically includes a first threaded member which is heated to such temperature, whereby treating liquid such as lubricant may be readily applied to the member for lubricating the make-up connection with a second threaded member, such members typically providing pin and box connections. Alternatively, a made-up joint may be induction heated in accordance with the invention to facilitate disconnection of pin and box members.

Accordingly, the invention provides a process by which the pipe ends can be heated electrically for cleaning, inspection and assembly, which eliminates the above described problems. Special induction heating coils enable raising of the temperature of the pipe ends by predetermined amount, as required by the weather conditions at the time. This makes possible the proper cleaning of the threads without the need for special solvents or enclosures. Depending on the size and weight of the pipe being heated, a temperature rise of 100° F. can be produced in typical heating times of five to twelve seconds. After cleaning and inspection, the ends can again be heated for application of the normal lubricants and normal assembly procedures without special enclosures.

Extra tightness may sometimes be required when making certain joints. By differential heating of the pin and box joints, a shrink or selective shrink fit can be made. Also because the heating is done very rapidly, this heating method can be used to expand the box to unscrew a tight thread without heavy torque equipment.

In its basic apparatus aspects, the invention includes (a) an electrical coil of cylindrical configuration to telescopically fit the pipe connection, the coil adapted to receive AC current, (b) means carrying said coil, including a sleeve sized to telescopically interfit the connection and a handle on the sleeve to enable the sleeve and coil to be relatively telescopically interfitted to the pipe connection and separated therefrom.

As will appear, a stop may be provided to limit relative telescopic interfit of the sleeve and pipe connection; the stop may be carried by the handle to project axially and interiorly of the sleeve; the handle may extend transversely of the sleeve and at one end of the latter and be connected thereto; the sleeve and coil may be sized to fit about the pipe connection which may be defined by pipe pin or box members, or a pipe joint; and the handle may be extend transversely everywhere out of alignment with a bore defined by the sleeve and/or coil so that the latter may pass over and along a pipe and pipe connection to a desired location.

These and other objects and advantages of the invention, as well as the details of illustrative embodiments, will be more fully understood from the following description and drawings, in which:

DRAWING DESCRIPTION

FIG. 4 is a view like FIG. 1 but showing another form of the invention;

FIG. 6 shows use of the invention.

DETAILED DESCRIPTION

Figure 1:
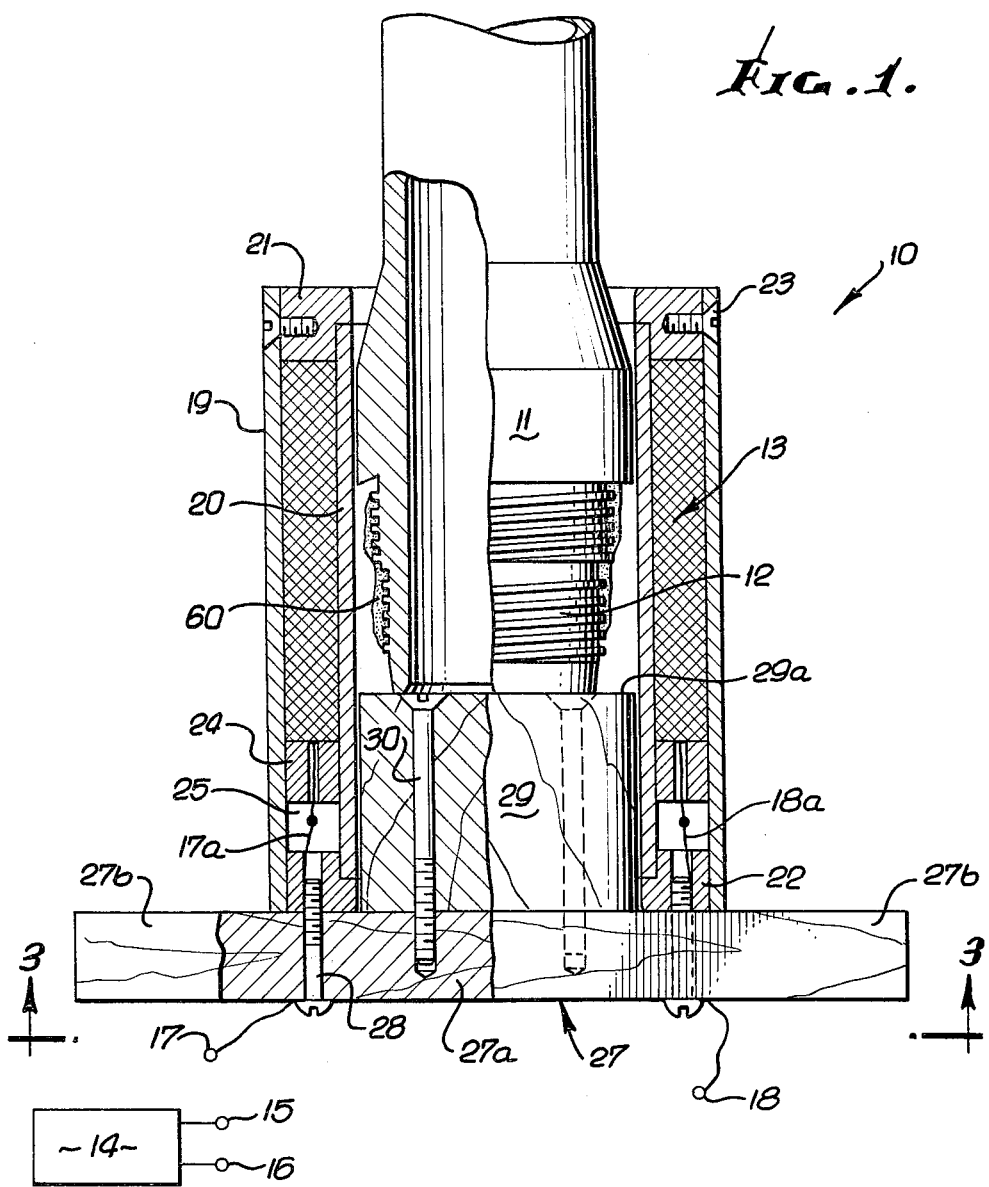
FIG. 1 is a vertical elevation taken in section through equipment embodying the invention, and shown, receiving a pin connection.
Figure 3:
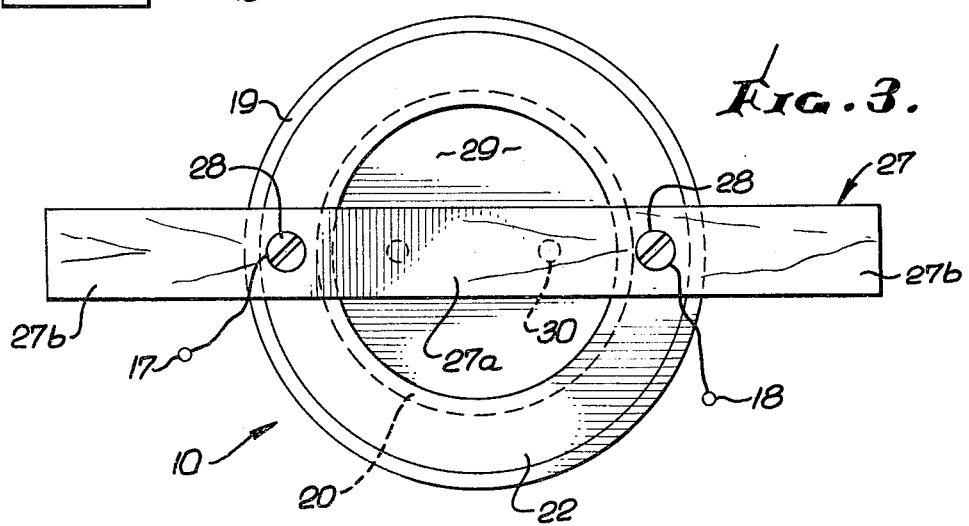
FIG. 3 is an end view on lines 3—3 of FIG. 1.

Referring first to FIGS. 1 and 3, the illustrated apparatus 10 is adapted to treat, as for example to inductively heat, a well pipe connection of steel construction. One such connection is shown at 11 in the form of a pipe pin connection which is threaded at 12 to receive lubricant. As will appear, inductive heating of the pin connection to elevated temperature, i.e. between 75° F. and 500° F., facilitates heat transfer to the lubricant so as to reduce its viscosity, as for example in cold or arctic climates. This in turn enables lubricant flow in intimate contact with pin and box member threads to facilitate make-up of pin and box joints, as at a well rig where pipe lengths or stands are made-up and disconnected in conjunctiion with running pipe into and out of the hole. Lubricant appears at 60.

The apparatus 10 comprises an electrical coil 13 of generally cylindrical configuration to telescopically fit the pipe connection, as for example over the latter. Means to transmit AC current to the coil, and to control such transmission is shown generally at 14, with lead terminals 15 and 16 connectible with coil terminals 17 and 18.

Means is provided to carry the coil, and may advantageously comprise a sleeve that typically includes axially elongated sleeve sections 19 and 20 at the outer and inner sides of the coil. Such sections may consist of non-conducting material softer than the pipe connection steel, for example PVC, in order not to damage connection threads. The sections are sized to telescopically interfit the connection 11, and the bore of section 20 typically closely extends about the connection. End rings 21 and 22 are attached to section 20, and outer section 19 may be releasably attached to ring 21 as by fasteners 23, whereby removal of the section 19 exposes the coil for inspection and/or repair. Another ring 24 extends at the end of the coil 13 closest to ring 22, and is spaced from the latter at 25, whereby the coil leads 17a and 18a may be gathered in space 25 for ultimate passage through ring 22 and connection to control means 14. Rings 21, 22 and 24 may be adhesively bonded or otherwise connected to sleeve section 20.

Further in accordance with the invention, a handle is provided on the sleeve to enable the relatively heavy sleeve and coil to be manipulated into relative telescopic interfit with the pipe connection and subsequently separated from the latter. Such a handle may take the form of that indicated at 27, with a central section 27a in alignment with the pipe connection, and with opposite projections 27b adapted to be manually grasped, outwardly of a cylinder defined by sleeve section 19. The handle may be releasably attached to the sleeve section, as via fasteners 28 attached to the ring 22, as shown. A stop is also provided in position to limit relative telescopic interfitting of the sleeve and pipe connection. One highly advantageous form of stop is indicated at 29 as removably attached to the handle central section, as via fasteners 30, the stop projecting interiorly of the sleeve section 20 and having an outer diameter substantially the same as the bore diameter of section 20. The end face 29a of the stop is located radially inwardly of the coil 13, near ring 24. In order not to damage the pipe connection, the stop is preferably softer than the steel of the connection, and may for example consist of hard wood, as may handle 27.

Figure 2:
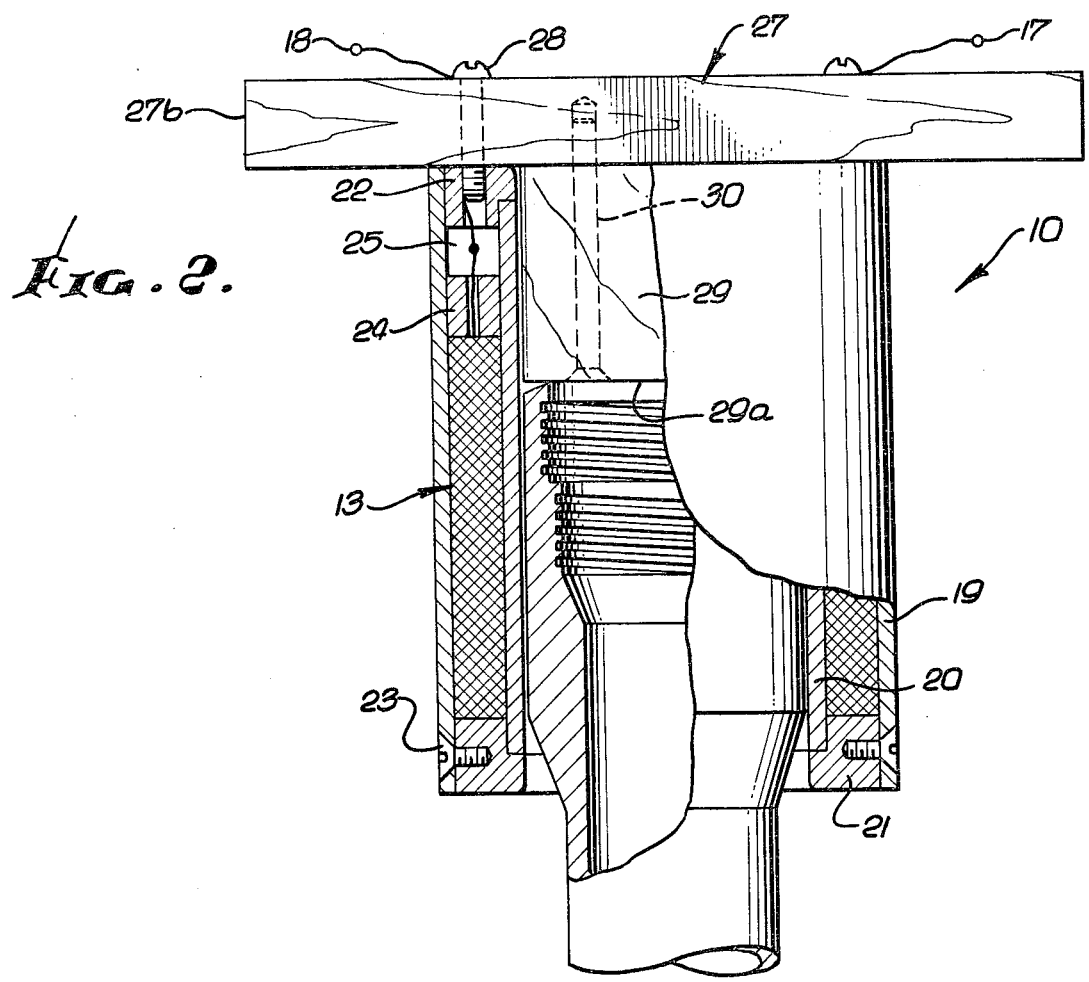
FIG. 2 is a view like FIG. 1, but showing the equipment receiving a box connection.

The method of use of the pipe connection involves relatively applying the sleeve to a position about the connection so that the coil also extends about it. This may advantageously be determined by the stop, as described. Electrical AC current is then passed through the coil to effect induction heating of the connection to a temperature within a range of between about 75° F. and 500° F., so that the connection is quickly heated and transmits heat to lubricant on the threads, to lower viscosity of same and enable flowing into intimate contact with the threads. The connection then may be easily made-up to another threaded connection, even in the coldest climates. The apparatus is shown in FIG. 1 heating a pin connection, and in FIG. 2 as heating a box connection. If desired, the box connection may be heated to greater extent than the pin connection, to thermally expand it for easier reception of the pin connection.

FIG. 4 shows an alternate design, whereby the handle sections 127b project outwardly from a handle ring 128 fitted about sleeve section 19 and attached thereto. The apparatus may thereby be run endwise along a pipe to a made-up connection designated at 129 to heat same as described above, for softening lubricant and expanding the box member facilitating disconnection of the pin and box members, 129a and 129b.

Figure 5:
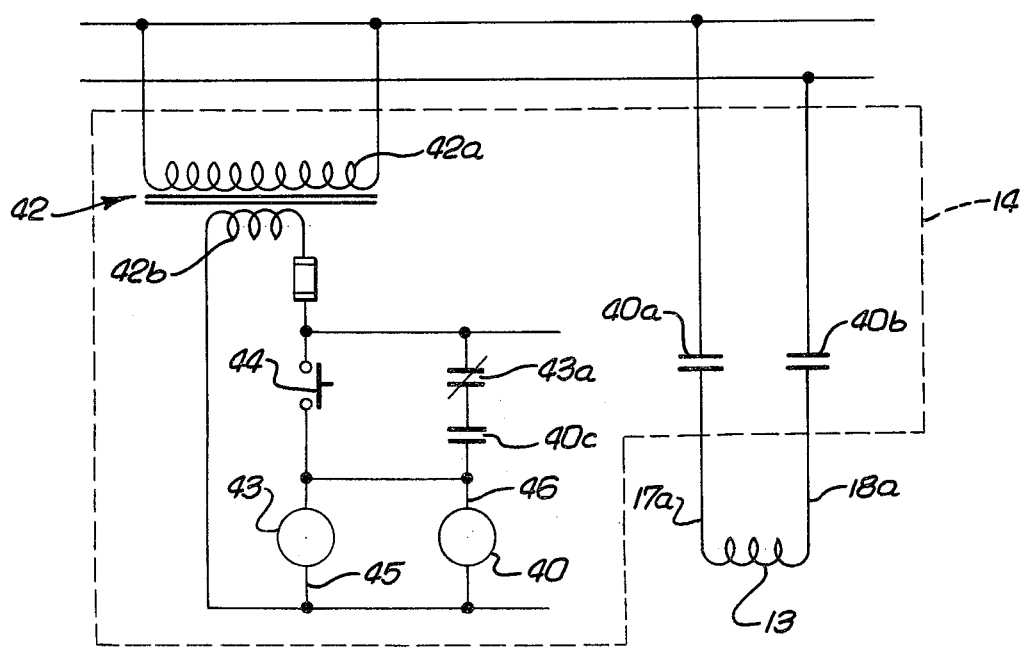
FIG. 5 is a control circuit diagram.

Electrical circuitry associated with the invention appears in FIG. 5. As shown, the control means 14 includes contacts 40a and 40b in series with leads 17a and 18a of the induction heating coil 13. A transformer 42 includes primary and secondary coils 42a and 42b to provide isolated current for operation of the control circuit. A timer relay 43 with its normally closed contact 43a and a main contactor 40 with its main contacts 40a and 40b are provided to control the induction coil current and auxiliary control contact 40c. Push button switch 44, when closed, will energize relay 43 and contactor 40. Contact 40c will complete the circuit maintaining both relay 43 and contactor 40 energized through contact 43a. *After a predetermined time interval after relay 43 was energized, contact 43a will open, de-energizing relay 43 and contactor 40, which will disconnect induction coil 13.*

In FIG. 6, the apparatus 10 is shown carried by workmen's hands 61, in heating position encompassing a downwardly projecting pin member on pipe section 62 at an oil well site. Subsequently, the workmen reverse the apparatus 10 to apply it downwardly, as at 10a, in encompassing relation with the upwardly projecting box member 63 on pipe section 64. The deck at the well site appears at 65.

I claim:

1. The method of assembling a threaded connection in extremely cold environment, said method employing an electrical coil having cylindrical configuration, said connection defined by a pin connection of a first pipe and a box connection of a second pipe the steps including:
   (a) relatively applying the coil to a position about the pin connection of the first pipe so that the coil extends about the pin connection, and
   (b) passing electrical current through the coil to effect induction heating of said pin connection to temperature within the range of 75° F. and 500° F., and
   (c) relatively removing the coil from said position, and
   (d) relatively applying the coil to a position about the box connection of the second pipe so that the coil extends about the box connection, and
   (e) passing electrical current through the coil to effect induction heating of said box connection to about the same temperature as said pin connection, and
   (f) relatively removing the coil from said position about the box connection,
   (g) there being treating liquid applied to the thread of at least one connection, said induction heating allowing said liquid to flow on said heated pin and box connections, and
   (h) screwing the said pin and box connections together in a relatively equally heated condition.

2. The method of claim 1 wherein said liquid includes lubricant to assist said screwing together of the connections.

3. The method of claim 1 wherein a handle is carried by a sleeve supporting the coil, and a stop is located within an interior zone bounded by the sleeve, and wherein said application of the coil about the pin and box connections includes manually manipulating said handle to bring said stop into engagement with the end of each connection.

4. The method of claim 3 including the steps of preliminarily removably connecting the handle to the end of the sleeve to extend transversely of an axis defined by the sleeve.

5. The method of claim 4 which includes preliminary forming said stop to fit within the sleeve, and removably attaching the stop to the handle.

6. In apparatus for treating, including induction heating, a well pipe connection of steel construction, the combination comprising
   (a) an electrical coil of cylindrical configuration to telescopically fit the pipe connection, the coil adapted to receive AC current,
   (b) means carrying said coil, including a sleeve sized to telescopically interfit the connection and a handle on the sleeve to enable the sleeve and coil to be relatively telescopically interfitted to the pipe connection and separated therefrom,
   (c) and a stop in the form of a block integral with at least one of said sleeve and handle and positioned to limit relative telescopic interfitting of the sleeve and connection, the stop block having a surface to engage the end of the connection within the sleeve, the stop attached to the handle and said surface having hardness less that that of said connection end.

7. The combination of claim 6 including said connection interfitting said sleeve and coil.

8. The combination of claim 6 wherein the sleeve and coil are sized to extend closely about the connection.

9. The combination of claim 8 including said connection received by the coil and sleeve.

10. The combination of claim 9 wherein said connection comprises a threaded box.

11. The combination of claim 9 wherein the connection comprises a threaded pin.

12. The combination of claim 6 wherein said connection comprises interfitting pin and box members about which said coil and sleeve extend.

13. The combination of claim 6 wherein lubricant is applied to threads defined by said connection to be heated by the inductively heated connection for lowering the viscosity of the lubricant.

14. The combination of claim 6 wherein the handle extends transversely of an axis defined by the sleeve, the handle is removably attached to the sleeve at one end thereof, and the stop is attached to the handle to project interiorly of the sleeve.

15. The combination of claim 6 wherein the handle extends transversely everywhere out of alignment with a bore defined by the sleeve so that the sleeve and coil may pass relatively over and along a pipe and pipe connection, to a desired location.

16. The combination of claim 6 including control means connected with said coil due to transmit AC current to the coil and to control the duration of said transmission.

* * * * *